US010853542B1

(12) United States Patent
Sengupta et al.

(10) Patent No.: US 10,853,542 B1
(45) Date of Patent: Dec. 1, 2020

(54) FUSE-BASED LOGIC REPAIR

(71) Applicant: QUALCOMM Incorporated, San Diego, CA (US)

(72) Inventors: Samit Sengupta, San Diego, CA (US); Anil Chowdary Kota, San Diego, CA (US); Fadoua Chafik, San Diego, CA (US)

(73) Assignee: QUALCOMM Incorporated—, San Diego, CA (US)

( * ) Notice: Subject to any disclaimer, the term of this patent is extended or adjusted under 35 U.S.C. 154(b) by 0 days.

(21) Appl. No.: 16/442,347

(22) Filed: Jun. 14, 2019

(51) Int. Cl.
*G06F 17/50* (2006.01)
*G01R 31/00* (2006.01)
*G06F 30/327* (2020.01)
*G06F 30/33* (2020.01)
*G06F 30/34* (2020.01)
*G06F 30/3323* (2020.01)
*G01R 31/3183* (2006.01)

(52) U.S. Cl.
CPC ............ *G06F 30/327* (2020.01); *G06F 30/33* (2020.01); *G06F 30/3323* (2020.01); *G06F 30/34* (2020.01); *G01R 31/318371* (2013.01)

(58) Field of Classification Search
CPC ........ G06F 30/327; G06F 30/34; G06F 30/33; G06F 30/3323; G01R 31/318371
USPC ....... 716/103, 116, 121, 128; 703/16; 713/2, 713/100
See application file for complete search history.

(56) References Cited

U.S. PATENT DOCUMENTS

| | | | | |
|---|---|---|---|---|
| 5,122,685 | A * | 6/1992 | Chan | H03K 19/1737 326/40 |
| 5,349,248 | A * | 9/1994 | Parlour | G11C 17/16 326/38 |
| 5,488,315 | A * | 1/1996 | Mahant-Shetti | G06F 7/501 326/37 |
| 5,744,979 | A * | 4/1998 | Goetting | G01R 31/318516 326/39 |
| 9,274,171 | B1 * | 3/2016 | Arsovski | G01R 31/3177 |
| 2005/0024974 | A1 * | 2/2005 | Noguchi | G06F 11/1008 365/230.03 |
| 2005/0144524 | A1 * | 6/2005 | Bonaccio | G06F 1/04 714/27 |
| 2008/0077900 | A1 * | 3/2008 | Oh | G06F 30/33 716/114 |
| 2014/0332979 | A1 * | 11/2014 | Cicalo | H01L 23/481 257/774 |
| 2016/0070841 | A1 * | 3/2016 | Salowe | H01L 23/528 716/112 |
| 2017/0351785 | A1 * | 12/2017 | Dhanwada | G06F 30/327 |

\* cited by examiner

*Primary Examiner* — Phallaka Kik
(74) *Attorney, Agent, or Firm* — Seyfarth Shaw LLP

(57) ABSTRACT

A method for repairing logic design includes inserting primary logic gates in a primary logic design path of a logic chip. The method also includes inserting alternative logic gates in an alternate logic design path of the logic chip. The alternate logic design path and the primary logic design path are coupled to multiple fuses. The potentially defective design is repaired by selecting between the alternate logic design path and the primary logic design path with the fuses when the logic design is defective.

20 Claims, 11 Drawing Sheets

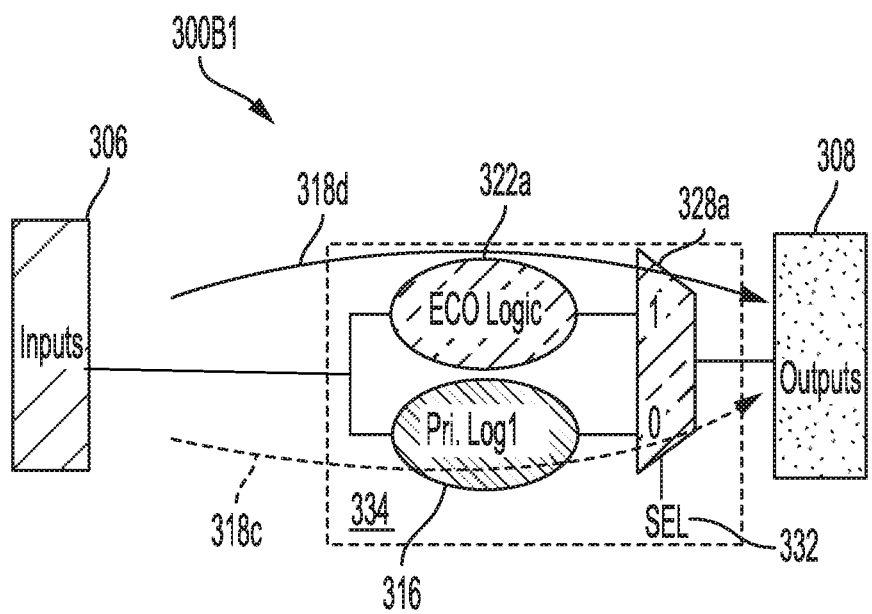
FIG. 3B1
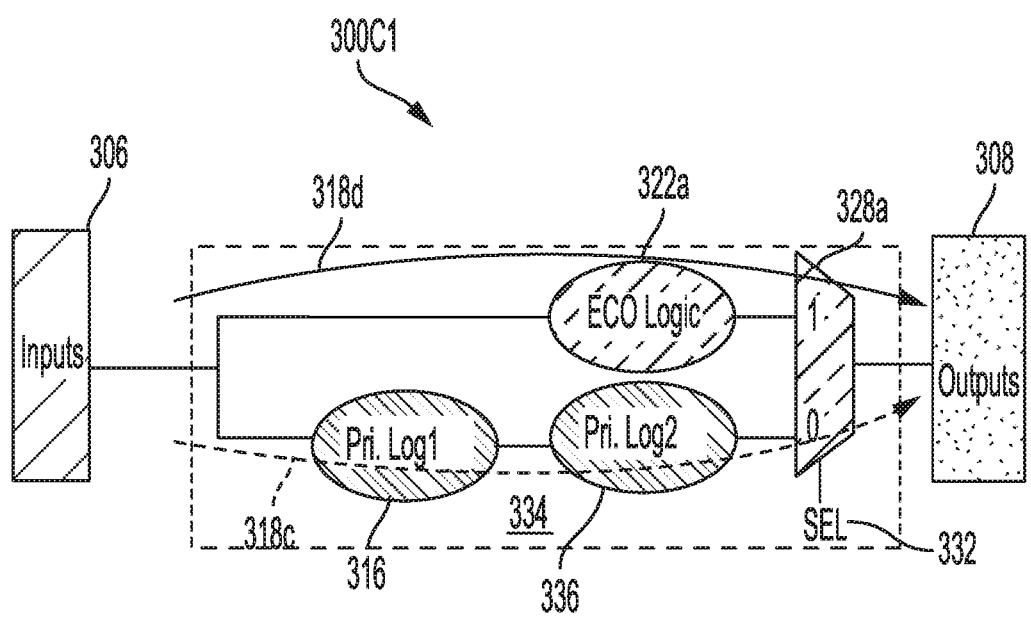
FIG. 3C1

FUSE-BASED LOGIC REPAIR

TECHNICAL FIELD

The present disclosure generally relates to logic chip design. More specifically, the present disclosure relates to a design scheme for logic repair using fuse programming.

BACKGROUND

Often, an integrated circuit (IC), such as a system on chip (SOC), includes a one-time-programmable (OTP) memory that allows one or more cores of the IC to permanently write data to the memory. The OTP memory generally does not contain data when the IC is manufactured. During initialization or subsequently throughout the course of operation of the IC, one or more cores may permanently write data to the OTP memory, such as, for example, calibration data, initialization data, identification data, or other data as specified.

An OTP memory includes a two-dimensional array of memory cells. Memory cells common to rows are coupled to corresponding word lines (WLs) of the memory. Memory cells common to a column are coupled to corresponding bit lines (BLs) of the memory. Each memory cell of an OTP memory may be configured as an electronic fuse (efuse) type cell. The cell includes a fuse element coupled in series with a transistor (e.g., in series with the drain and source of a field effect transistor (FET)) between the corresponding bit line (BL) and a power rail VSS (e.g., ground). Each transistor of each memory cell includes a control terminal (e.g., gate) coupled to the corresponding word line (WL).

Generally, the programming of (writing data to) an OTP memory may be performed a single bit at a time. In this regard, the voltages on the word line (WL) and the bit line (BL) corresponding to the memory cell (to-be-programmed) are both raised to programming voltage (e.g., 1.8V). This produces a current through the corresponding fuse element and FET sufficient to blow the fuse element (e.g., produce an "open" in the fuse metallization due to electromigration).

SUMMARY

According to one aspect of the present disclosure, a method for repairing a logic design includes inserting primary logic gates in a primary logic design path of a logic chip. The method also includes inserting alternative logic gates in an alternate logic design path of the logic chip. The method further includes coupling the alternate logic design path and the primary logic design path to multiple fuses. Furthermore, the method includes selecting between the alternate logic design path and the primary logic design path with the multiple fuses when the logic design is defective.

Another aspect discloses an apparatus for repairing a logic design that includes a memory and at least one processor coupled to the memory. The processor(s) is configured to cause primary logic gates to be inserted in a primary logic design path of a logic chip. The processor(s) is also configured to cause alternative logic gates to be inserted in an alternate logic design path of the logic chip. The processor(s) is further configured to cause the alternate logic design path and the primary logic design path to be coupled to multiple fuses. Furthermore, the processor(s) is configured to select between the alternate logic design path and the primary logic design path with the multiple fuses when the logic design is defective.

Yet another aspect discloses a computer program product or computer-readable medium for repairing a logic design. The computer-readable medium has non-transitory program code recorded thereon which, when executed by a processor(s), causes the processor(s) to cause primary logic gates to be inserted in a primary logic design path of a logic chip. The computer-readable medium also has non-transitory program code recorded thereon which, when executed by the processor(s), causes the processor(s) to cause alternative logic gates to be inserted in an alternate logic design path of the logic chip. The computer-readable medium further has non-transitory program code recorded thereon which, when executed by the processor(s), causes the processor(s) to cause the alternate logic design path and the primary logic design path to be coupled to multiple fuses. Furthermore, the computer-readable medium has non-transitory program code recorded thereon which, when executed by the processor(s), causes the processor(s) to select between the alternate logic design path and the primary logic design path with the multiple fuses when the logic design is defective.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
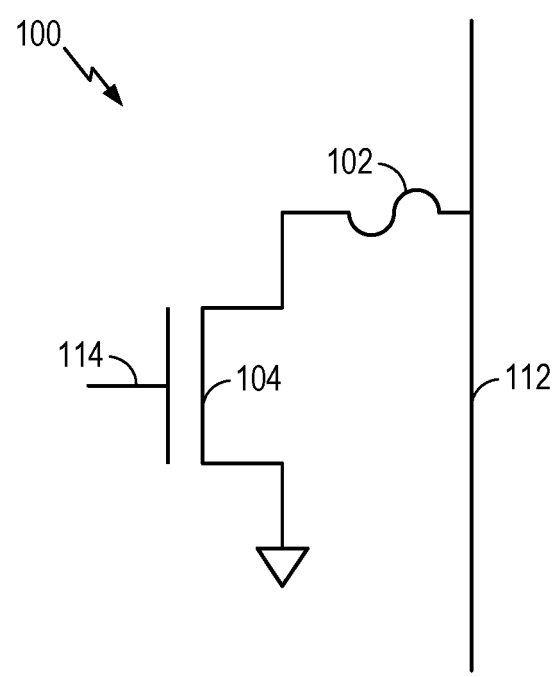
FIG. 1 is a circuit schematic illustrating a fuse bitcell.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Post-silicon testing and validation are performed to ensure that all of the functions of the chip are working properly. Post-silicon testing and validation of a new chip design uncovers timing or functional failures that may be rectified by design to prevent significant yield loss or field reliability fails. Previous solutions recover failures (where possible) by implementing specification changes or by de-featuring the chip. Some circuit blocks of the logic chip may be faulty (e.g., not meeting the design speed). For example, the chip may be designed for two gigahertz (2 GHz) frequency and due to the manufacturing process, the actual frequency that a die of the chip can operate is slower, or is offset (e.g., to 1.8 GHz). In some instances, the die may turn out to be faster than normal due to variations in the manufacturing process. To mitigate these issues, designers can change the specification to the slower speed.

Alternatively, designers may redesign the logic circuit or chip that causes a delay in the chip bring-up and validation process, or may purposely speed up the silicon via the fabrication process itself. For example, partial failure recovery may be achieved by a fabrication process tuning or tightening the fabrication process controls. Another solution to fix defects includes implementing timing or functional engineering change orders (ECOs) using design or layout modifications that specify one or more mask layer changes (in metal interconnect layers, front-end-of-line (FEOL) layers, or both). Engineering change orders are commonly used to fix design bugs in advanced technologies, and are implemented as a late-stage design change or when identified from silicon during the chip testing and validation phase.

The post-silicon metal engineering change process is very time consuming and may lead to a delay of months before the logic chip can be brought to market. For example, subsequent to the design fix, affected masks are re-made and leading wafers are processed with the new masks. Processed wafers are eventually re-tested to verify the design solution. The re-testing and verification may take weeks or months following identification of the design fix. An exemplary description of a post-silicon metal engineering change flow is as follows.

A post-silicon metal engineering change flow may include a pre-tape out stage, a chip tape out stage (e.g., original tape out), mask-making and fabrication processing, post-silicon testing and design validation, release of the engineering change order to rectify timing or functional failures on the silicon, design revision, and post-silicon testing and validation. The pre-tape out stage may include inserting spare/filler engineering change order cells (e.g., logic gates) during a place and route stage for potential use in a post-silicon design fix. For example, the spare/filler engineering change order cells are a set of library gates including NAND (not AND), NOR (not OR), INVERTER, XOR (exclusive OR), XNOR (exclusive NOR), flip flops, buffers, etc. The logic chip design is then submitted in accordance with an original tape out. The mask-making and fabrication process may take about three months. The post-silicon and design validation process may take a minimum of two to four months. The engineering change order for timing or functional failures on the silicon may take about one month. This process involves identification of an engineering change order fix, implementation, verification, and re-tape out.

The release of the engineering change order for timing or functional failures on the silicon is due to a defect in the logic design that will undergo re-tape out to fix the defects on the silicon chip. This stage may be referred to as a post-silicon design fix. The post-silicon design fix involves timing or logic (e.g., functional) path changes that entail swapping of existing standard cells or logic gates with nearby spare/filler engineering change order cells and/or a change of routing. The design modifications are implemented as a layout revision and all the changes are verified before re-tape out of the chip. In this stage, the spare or alternative logic gates or engineering change order cells are physically reconnected (connected and disconnected using metal layers) in the physical design.

The design revision stage includes a mask-making process and a fabrication process. This process may take from one month to three months depending on whether a pre-metal mask layer is specified. Because one or more layers are being changed, new mask(s) may be specified and at least some of the layers of the logic chip have to be re-run. The new silicon chip with the fix undergoes post-silicon testing and validation, which may take about one month. For example, the affected mask layers have to be re-spun, new silicon wafers processed with the new masks, and subsequently tested to verify the design changes. In total, up to eight months can be consumed after the original tapeout to fix a defect in a design of the chip.

Aspects of the present disclosure circumvent the post-silicon engineering change order stage, by using existing fuses to re-configure and thereby repair the design in limited cases. The specified fuses can be programmed during an initial silicon bring-up phase and the repair validated in real time, saving significant time and cost because no new masks or silicon are specified, as opposed to traditional engineering change order. To fix the design in accordance with aspects of the present disclosure, alternate design(s) are specified to be present on the original tape out database. Relevant fuse bit(s) are used to enable the switch between the primary or initial logic design and the alternate logic design. The primary logic design is different from the alternate logic design in terms of timing or functionality. The primary logic design may have a different yield and/or performance than the alternate logic design.

One-time programmable (OTP) blocks such as on-chip fuse-based programmable read-only memory are configured to support multiple functions such as memory repair, security, chip identification, analog trimming, etc. The fuse memory may be implemented as a laser fuse or electrical fuse.

Aspects of the present disclosure are directed to a novel method of performing logic repair using fuse programming without the conventional ECO process. The method results in significant savings in mask cost and an expedited time-to-market schedule. Fuse programming has been used for memory repair trimming (where basic functionality is retained), or for correcting for process variations by selecting or adjusting resistors and/or capacitors in analog circuits that are very sensitive to the fabrication processes. For example, one-time programmable (OTP) blocks such as on-chip fuse-based programmable read-only memory are configured to support multiple functions such as memory repair, security, chip identification, analog trimming, etc.

In memory repair, fuse programming can be used to select a different column or a row. The rows and columns are bit cells and fuses can be used to select different rows and columns. For example, if a particular memory bit is failing (e.g., due to the manufacturing process itself, and not because the design of the logic may be defective, fuses can be used to bypass the failing bit and to select another bit to avoid discarding the silicon. The new column, however, is the same as the bypassed column. Thus, with memory switching, the functionality of the cells do not change.

During a design phase of the logic chip, a designer identifies a potentially defective path of the chip (e.g., a slow path of the chip) or a path that is expected to be defective. For example, a designer may identify multiple critical paths of a central processing unit and identify that one of the paths is slow and inhibits the central processing unit from running at full speed. Although designers may attempt to rectify the fault, designers, however, may not be able to predict the effect of the manufacturing process on the slow paths. As a result, the fault may persist after the chip is manufactured.

To facilitate the present disclosure, a designer may pre-design multiple paths and identify the slowest paths of the chip and pre-design a path (e.g., an alternate logic design path) that is improved (e.g., faster) prior to the original tape out. For example, the alternate logic design path is pre-routed prior to the original tape out. After manufacturing the chip (post-silicon) the first time, the pre-designed (pre-routed) fast path may be selected using fuse programming. Thus, an alternate route or path is pre-designed that can be enabled using fuse programming (e.g., efuse programming or antifuse programming) when a defect (e.g., a timing or functional failure or a manufacturing-related defect) in the original path is found. With efuse switching, the functionality of the logic of the alternate logic design path is different from the functionality of the logic in the primary logic design path.

Aspects of the present disclosure are directed to a method for repairing the logic design, which includes inserting primary logic gates in a primary logic design path of a logic chip. The primary logic design path may have a potentially defective design. For example, a circuit block of the primary logic design path is identified to be potentially defective or expected to be defective by a designer. Spare logic gates are also inserted in an alternate logic design path of the logic chip. For example, the designer may identify the slowest paths of the logic chip and pre-design the alternate logic design path, which is faster, prior to tape out using the spare logic gates. Thus, the alternate logic design path is pre-routed prior to an original tape out of the logic chip. The alternate logic design path and the primary logic design path are coupled to multiple fuses (e.g., efuses or antifuses). The multiple efuses may be part of an on-chip fuse-based programmable read-only memory. The potentially defective design is repaired by selecting between the alternate logic design path and the primary logic design path with the fuses when the design is defective.

Some of the fuses in the on-chip fuse-based programmable read-only memory are used to control a selection of the alternate logic design path and the primary logic design path. For example, a programmable signal is provided by the fuses when it is determined that at least a portion of the primary logic design path is defective. The defective primary logic design may be within a circuit block of the logic chip. In one aspect, repairing the defective design includes disabling at least a portion of the primary logic design path based on the programmable signal. In conjunction with the disabling or independent of the disabling, the repairing includes enabling the alternate logic design path with the programmable signal to bypass the defective portion of the primary logic design path.

In some aspects, the alternate logic design path and the primary logic design path are coupled to the efuses via a multiplexer (e.g., a design selection multiplexer). For example, the multiplexer is controlled with the programmable signal (e.g., an enable/disable signal) from one or more of the fuses in order to select the alternate logic design path or to bypass and the primary logic design path.

In one aspect, an efuse in the programmable fuse bitcell array may be blown and the programmable signal associated with the blown fuse is used to select a design configuration (e.g., the primary logic design path or the alternate logic design path) of a digital logic device. A memory cell that has its fuse blown may be assigned a bit value (e.g., a logic one (1)), and a memory cell that has not had its fuse blown may be assigned another bit value (e.g., a logic zero (0)). The programmable signal (e.g., having a bit value of "1" or "0" from the multiple fuses) are read during power up of the logic chip.

A system controller or any other controller may determine an efuse to be blown in order to configure the design selection. The determination may be based on test data. The alternate logic design path may have a different functionality, performance, power, yield or reliability than the primary logic design path. The logic chip may be a central processing unit (CPU). The performance (or power) of the central processing unit is one example feature that can be improved using the described implementation. Functionality, yield, performance and/or other parameters of logic devices may be improved using the aspects of the present disclosure. Aspects of the present disclosure results in significant savings in mask cost and an expedited time-to-market schedule.

FIG. 1 is a circuit schematic illustrating a fuse bitcell. Although the fuse bitcell is described as a non-volatile memory (NVM) bitcell, the fuse bitcell can be any other bitcell. An NVM bitcell 100 includes a fuse element 102 and an access transistor 104. The fuse element 102 is coupled to a bitline 112 and the access transistor 104. A gate 114 of the access transistor 104 is coupled to a wordline.

Write operations in NVM bit cells involve large currents best handled by low resistance bit lines. Additionally, the access transistor for a write operation occupies a large die area to handle the large currents. Low resistance, large bit lines have a large capacitance. For example, some conventional bit lines have capacitances of several picoFarads.

Figure 2:
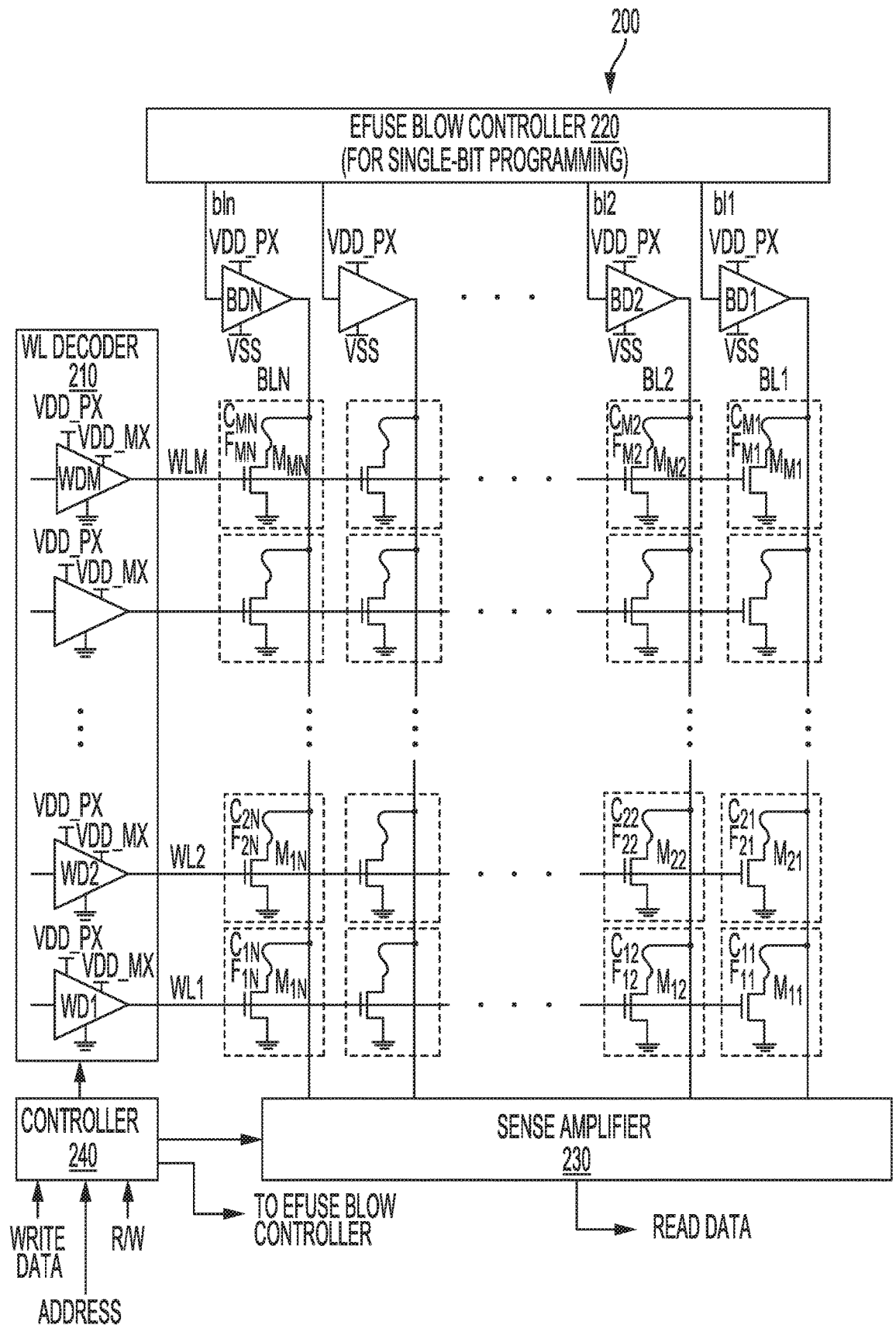
FIG. 2 illustrates a schematic diagram of an exemplary electronic fuse (efuse) one-time programmable (OTP) memory, in accordance with an aspect of the disclosure.

FIG. 2 illustrates a schematic diagram of a programmable fuse bitcell array. An example of an exemplary fuse bitcell array is an efuse one-time programmable (OTP) memory 200. Although the fuse bitcell array is described as an efuse one-time programmable memory, the fuse bitcell array can be any other bitcell array that is programmable.

The OTP memory 200 includes a word line (WL) decoder 210, an efuse blow controller 220 (for single-bit programming), a controller 240, a sense amplifier 230, and an M×N two-dimensional array of memory cells C11 to CMN.

The WL decoder 210 includes M word line drivers WD1 to WDM with outputs coupled to word lines WL1 to WLM, respectively. For single-bit memory cell programming, a selected one of the word line drivers WD1 to WDN, which corresponds to the word line coupled to the single cell to be programmed, is configured to generate a programming voltage VDD_PX (e.g., 1.8V) on the corresponding word line. For reading an entire row of memory cells, a selected one of the word line drivers WD1 to WDN, which corresponds to the word line coupled to the cells to be read, is configured to generate a lower (core) reading voltage VDD_MX (e.g., 1.0V).

The efuse blow controller 220 is configured to generate bit line programming signals bl1 to bln as inputs to a set of bit line drivers BD1 to BDN, respectively. The bit line drivers BD1 to BDN are configured to generate a programming voltage VDD_PX (e.g., 1.8V) sufficient to perform a single-bit memory cell programming. The outputs of the bit line drivers BD1 to BDN are coupled to bit lines BL1 to BLN, respectively. Accordingly, to effectuate single-bit memory cell programming, a selected one of the bit line programming signals bl1 to bln, which corresponds to the bit line coupled to the single memory cell to be programmed, is asserted to cause the corresponding one of the bit line drivers BD1 to BDN to generate the programming voltage VDD_PX (e.g., 1.8V) on the corresponding bit line.

The memory cells C11 to CMN comprise field effect transistors (FETs) M11 to MMN and fuse elements F11 to FMN, respectively. Each of the FETs M11 to MMN may be configured as an n-channel metal oxide semiconductor (NMOS) FET. Each of the fuse elements F11 to FMN may be configured as a thin metallization strip that is capable of being opened ("blown") when a sufficient amount of current is driven through the metallization strip due to electromigration.

In each cell, the fuse element is coupled in series with the drain and source of the FET between the corresponding bit line and a voltage rail VSS (e.g., ground). The corresponding FET includes a gate coupled to the corresponding word line.

The single-bit programming operation of the efuse OTP memory 200 may be as follows. In this example, the programming of cell C11 is exemplified. Programming of other cells operates in a similar manner. When programming of cell C11 is to occur, which means that the corresponding fuse element F11 of the cell C11 is to be blown, the WL decoder 210 activates the word line driver WD1, coupled to the gate of the FET M11 of the cell C11, to generate a programming voltage VDD_PX (e.g., 1.8V). The other word line drivers WD2 to WDM of the WL decoder 210 are not activated during programming of cell C11.

Additionally, the efuse blow controller 220 asserts bit line programming signal bl1 to cause the bit line driver BD1 to generate a programming voltage VDD_PX (e.g., 1.8V) on the bit line BL1 coupled to the cell C11. As this is only single-bit programming, the efuse blow controller 220 does not assert the other bit line programming signals bl2 to bln corresponding to the other bit lines BL2 to BLN, respectively. The word line WL1 and bit line BL1 being driven to respective programming voltages VDD_PX (e.g., 1.8V) produce sufficient current (e.g., 10-15 milliamps (ma)) through the fuse element F11 and the FET M11, which causes the fuse element F11 to blow.

A memory cell with a blown fuse element may be assigned a particular logic level, such as a logic one (1), whereas a memory cell with its fuse element not having been blown may be assigned to the opposite logic level, such as a logic zero (0). Following the programming of cell C11, the next cell C12 may be programmed if the corresponding bit should be, for example, a logic one (1). In this example, the maximum number of cells for each row that may be programmed is N, which could be, for example, 64.

While one-time programmable (OTP) blocks such as on-chip fuse-based programmable read-only memory are configured to support aspects of the present disclosure, other forms of internal (to chip) or external memory such as non-volatile memory (e.g., embedded flash, floating gate, resistive random access memory (RRAM), etc.) or static random access memory (SRAM)/dynamic random access memory (DRAM) may also be used to enable the engineering change order (ECO) implementation. The fuse for the engineering change order (ECO) implementation can be an efuse, an antifuse, etc.

FIGS. 3A-3I illustrate how an engineering change order logic is inserted in a logic chip to repair a defective design, according to aspects of the present disclosure. For illustrative purposes, some of the labelling and numbering of the devices and features of FIGS. 3A-3I are similar.

Figure 3A:
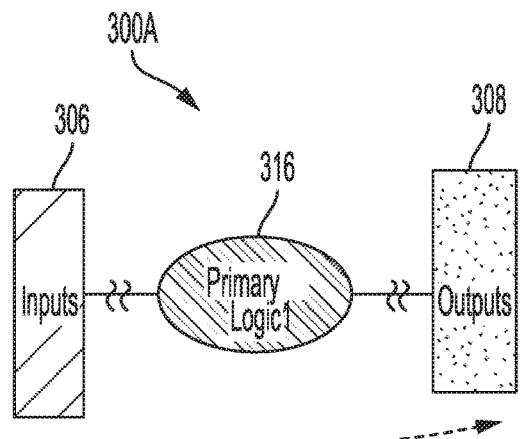
FIGS. 3A-3I illustrate how an engineering change order logic is inserted in a logic chip to repair a defective design, according to aspects of the present disclosure.

FIG. 3A illustrates a primary logic design path 318a that may include a digital logic device or chip 300A. The digital logic device 300A may include a digital system on chip (SOC), a digital system, or a digital subsystem. The primary logic design path 318a may include an input or a set of inputs 306, a first primary logic 316 (e.g., having functionality, yield, performance, and/or other features) and an output or set of outputs 308. For a given set of inputs, logic evaluation is performed and outputs are generated. When the first primary logic 316 (pri. log or functional logic1) is to be altered due to a defect after manufacturing the chip (e.g., after the original tape out and silicon manufacturing), an engineering change order (ECO) is performed and a re-tape out (limited or full) is done. This process is very time consuming and may lead to a delay of months before the logic chip can be brought to market, which is undesirable from a competitiveness standpoint.

Figure 3B:
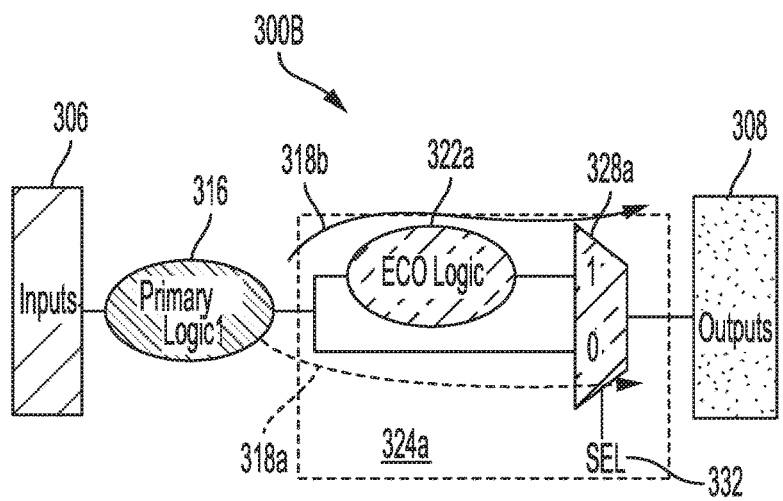

FIG. 3B illustrates adding a first alternate logic design 322a (e.g., pre-defined engineering change order logic) to a functional/yield/performance logic path of a digital logic device 300B, according to aspects of the present disclosure. The first alternate logic design 322a is configured to couple to the first primary logic 316 of FIG. 3A using efuse programmed select signals. The primary logic design path 318a may be within a first circuit block 324a that is pre-identified as potentially defective. To mitigate the potentially defective portion of the digital logic device 300B, a designer may pre-select spare logic gates of the digital logic device 300B to form the first alternate logic design 322a.

Examples of spare logic gates include inverters, buffers, NAND (not AND), NOR (not OR), XOR (exclusive OR), XNOR (exclusive NOR), flip flops and any other digital gates that can be programmed into the digital logic device 300B to correct functionality, improve yield and performance. The first alternate logic design 322a is deemed an engineering change order (ECO) logic in the alternate logic design path 318b. The first alternate logic design 322a is configured to improve functionality, yield, and/or performance of the digital logic device 300B. In this aspect, the first alternate logic design 322a is series with the first primary logic 316.

In some aspects, the alternate logic design path 318b and the primary logic design path 318a are coupled to multiple efuse (not shown) via a first multiplexer 328a. The first multiplexer 328a may be a 2:1 design selection multiplexer. The multiple efuses may be part of a programmable fuse bitcell array such as the efuse one-time programmable (OTP) memory 200 of FIG. 2. The first multiplexer 328a is controlled with a programmable signal 332 (e.g., enable/disable signal) from one of the multiple effuses. The programmable signal controls the first multiplexer 328a to select between the alternate logic design path 318b and the primary logic design path 318a to repair a defective design.

The programmable signal 332 becomes available from efuse one-time programmable memory, which is read during power up. For example, when the programmable signal is "0" (e.g., a default value), the alternate logic design path 318b is not enabled and therefore no engineering change order is performed. However, when the programmable signal is "1," the first alternate logic design 322a is enabled and included in the functional/yield/performance path of the digital logic device 300B. In this aspect, the first alternate logic design 322a is added to the first primary logic 316 without bypassing any other logic. This follows because the first alternate logic design 322a is designed to improve functionality, yield, and/or performance of the first primary logic 316.

Alternatively, the first alternate logic design 322a is in parallel with the first primary logic 316 where the first alternate logic design 322a and the first primary logic 316 are selectable or de-selectable (e.g., via a multiplexer), as shown in FIG. 3B1.

Figure 3C:
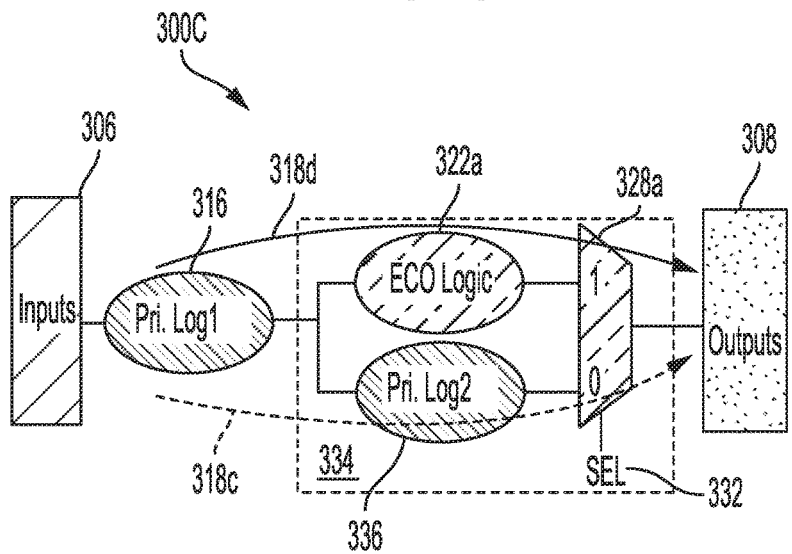

FIG. 3C illustrates a digital logic device 300C in which the first alternate logic design 322a is added to the first primary logic 316 while bypassing second primary logic 336 (pri. log 2) of a primary logic design path 318c, according to aspects of the present disclosure. In FIG. 3C, the primary logic design path 318c includes the first primary logic 316 and the second primary logic 336. An alternate logic design path 318d includes the first primary logic 316 and the first alternate logic design 322a. In this case, the first alternate logic design 322a is enabled by a first multiplexer 328a and the second primary logic 336 is disabled by the first multiplexer 328a. When a circuit block 334 in the primary logic design path 318c is deemed to be defective, the programmable signal 332 from the multiple efuses enables the first alternate logic design 322a and disables logic (e.g., the second primary logic 336) in the primary logic design path 318c that is associated with the defect. Thus, the second primary logic 336 is bypassed in lieu of the first alternate logic design 322a to improve functionality, yield, and/or performance of the digital logic device 300C.

Alternatively, the first alternate logic design 322a is in parallel with the first primary logic 316 and the second primary logic 336 where the first alternate logic design 322a and the combination of the first primary logic 316 and the second primary logic 336 are selectable or de-selectable (e.g., via a multiplexer), as shown in FIG. 3C1.

Figure 3D:
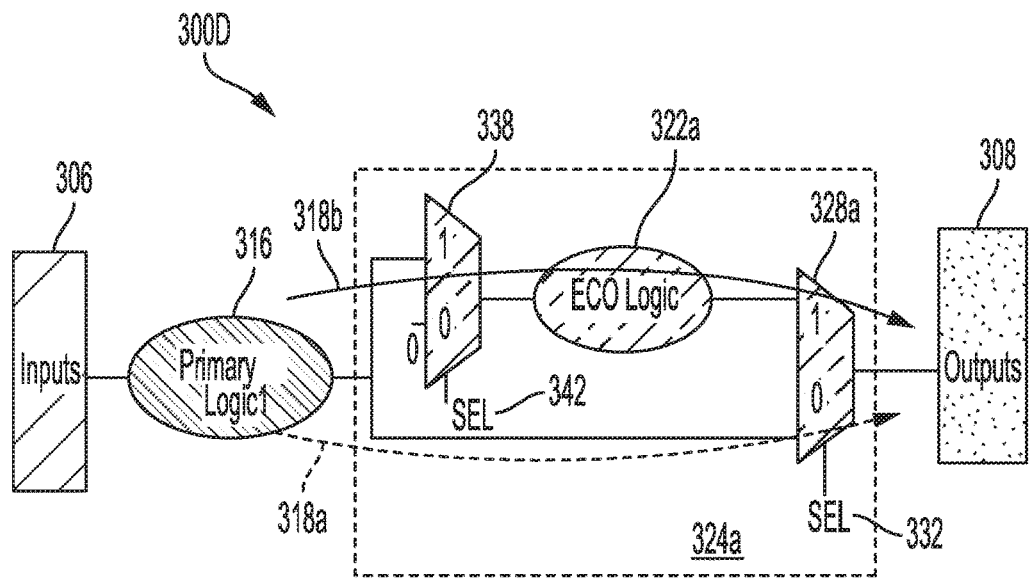

FIG. 3D illustrates a digital logic device 300D including an additional multiplexer 338 at an input of the first alternate logic design 322a, according to aspects of the present disclosure. The digital logic device 300D is similar to the digital logic device 300B. However, the digital logic device 300D includes the additional multiplexer 338 at the input of the first alternate logic design 322a to prevent toggles in the first alternate logic design 322a when it is not selected. For example, when a programmable signal 342 provided from an efuse to the multiplexer 338 is "0," the first alternate logic design 322a is not selected and is prevented from toggling to save power by the multiplexer 338. However, when the programmable signal 342 is "1," the first alternate logic design 322a is selected.

Alternatively, the first alternate logic design 322a is in parallel with the first primary logic 316 where the first alternate logic design 322a and the first primary logic 316 are selectable or de-selectable (e.g., via a multiplexer).

Figure 3E:
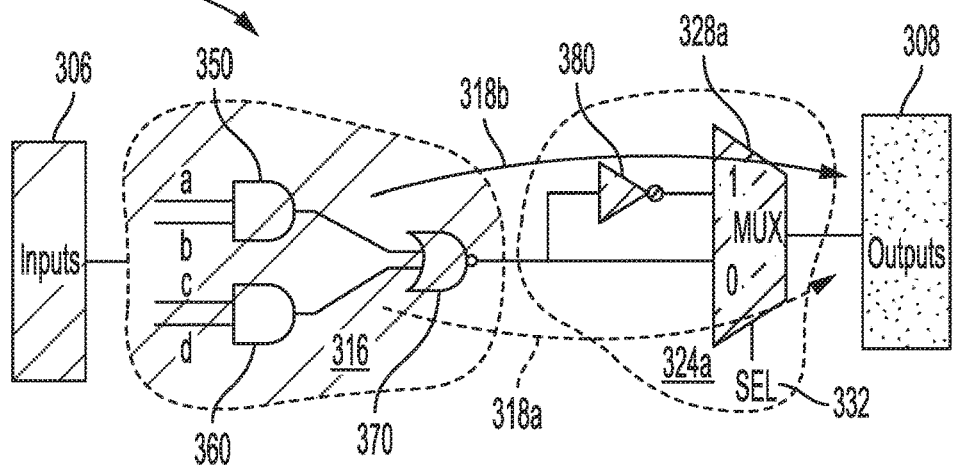

FIG. 3E illustrates a digital logic device 300E in which the first alternate logic design 322a includes an inverter 380, according to aspects of the present disclosure. The digital logic device 300E is similar to the digital logic device 300B. However, the digital logic device 300D illustrates that the first alternate logic design 322a is replaced with or includes the inverter 380 and the first primary logic 316 is replaced with or includes a first AND gate 350, a second AND gate 360, and a NOR gate 370. For example, when the programmable signal is "0," the inverter 380 is not enabled. The output of the digital logic device 300E is thus an inversion of a sum of the outputs of the first AND gate 350 and the second AND gate 360. In this case, the output of the digital logic device 300E is represented as !(ab+cd), where "a" and "b" are the inputs of the first AND gate 350 and "c" and "d" are the inputs of the second AND gate 360.

However, when the programmable signal is "1," the inverter 380 is enabled. The output of the digital logic device 300E is a sum of the outputs of the first AND gate 350 and the second AND gate 360. In this case, the output of the digital logic device 300E is represented as (ab+cd).

Figure 3F:
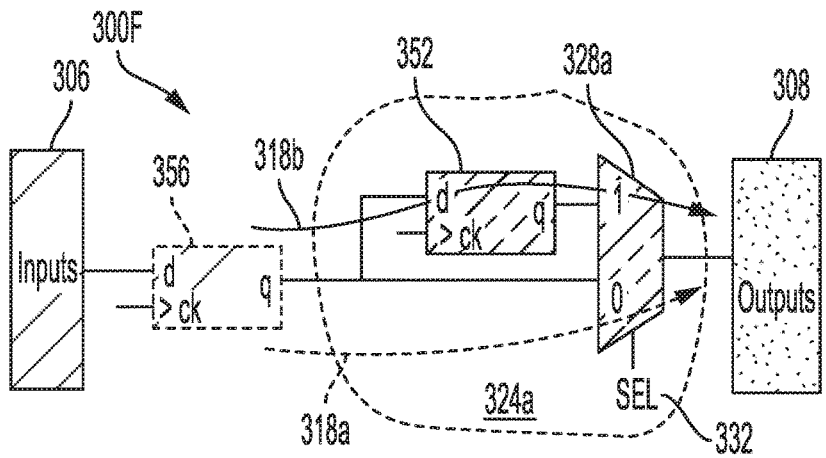

FIG. 3F illustrates a digital logic device 300F in which the first alternate logic design 322a includes a first flip flop 352, according to aspects of the present disclosure. The digital logic device 300F is similar to the digital logic device 300B. However, the digital logic device 300F illustrates that the first alternate logic design 322a is replaced with or includes the first flip flop 352 and the first primary logic 316 is replaced with or includes a second flip flop 356. For example, when the programmable signal is "0," the first flip flop 352 is not enabled. The output of the digital logic device 300F is thus an input of the digital logic device 300F after one clock cycle. However, when the programmable signal is "1," the first flip flop 352 is enabled. The output of the digital logic device 300F is an input of the digital logic device 300F after two clock cycles.

Figure 3G:
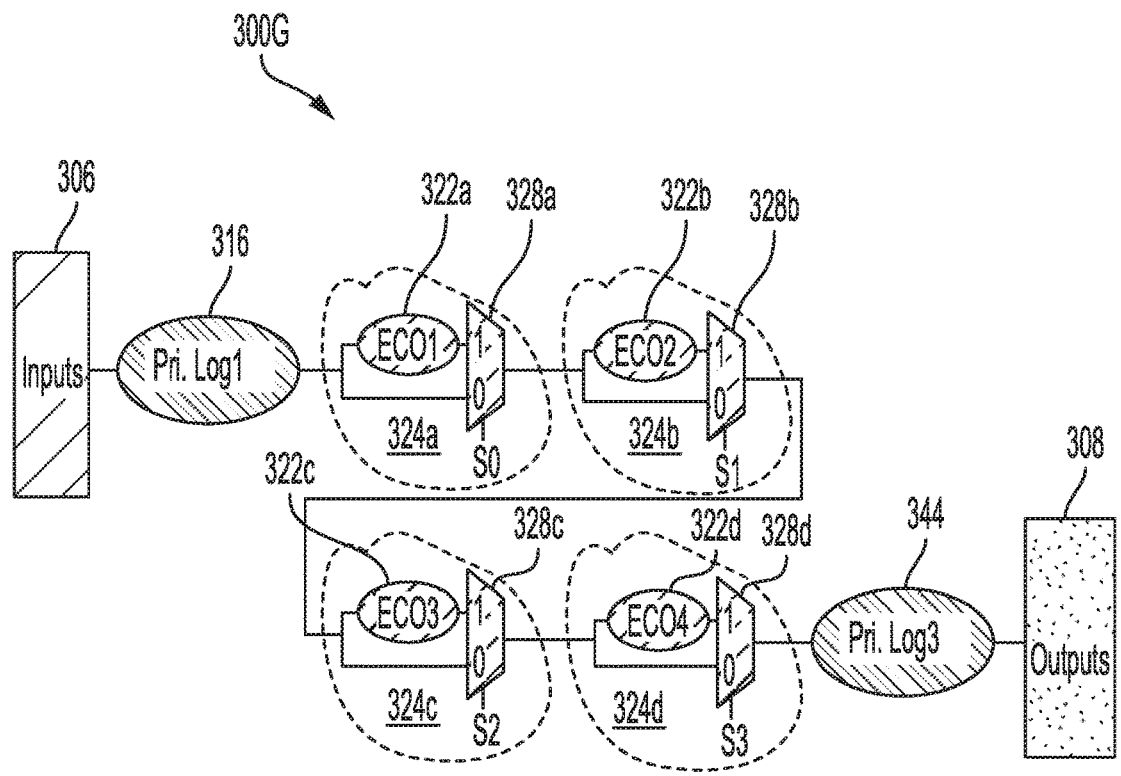

FIG. 3G illustrates a digital logic device 300G that includes multiple engineering change order logic or alternate logic designs in a logic path. The multiple alternate logic designs include the first alternate logic design 322a (or ECO1), a second alternate logic design 322b (or ECO2), a third alternate logic design 322c (or ECO3), and a fourth alternate logic design 322d (or ECO4). The first alternate logic design 322a, the second alternate logic design 322b, the third alternate logic design 322c, and the fourth alternate logic design 322d are in circuit blocks that are pre-identified as potentially defective. The first alternate logic design 322a, the second alternate logic design 322b, the third alternate logic design 322c, and the fourth alternate logic design 322d are respectively in the first circuit block 324a, a second circuit block 324b, a third circuit block 324c, and a fourth circuit block 324d.

Similar to the first circuit block 324a that includes the first multiplexer 328a, the second circuit block 324b includes a second multiplexer 328b, the third circuit block 324c includes a third multiplexer 328c, and the fourth circuit block 324d includes a fourth multiplexer 328d. The programmable signals to the first multiplexer 328a, the second multiplexer 328b, the third multiplexer 328c, and the fourth multiplexer 328d are respectively a first programmable signal S0 (or the programmable signal 332), a second programmable signal S1, a third programmable signal S2, and a fourth programmable signal S3. The circuit blocks are in series and between the first primary logic 316 and an additional primary logic 344 (pri. log 3) coupled to the output 308 of the digital logic device 300G.

By adding four engineering change order (ECO) logic or alternate logic designs in the logic path of the digital logic device 300G, there are sixteen ways of realizing an engineering change order with the four programmable signals S0, S1, S2, and S3. The programmable ECO logic cell can be further expanded to allow multiple selections. Table 1 illustrates multiple ways of realizing an engineering change order with the four programmable signals S0, S1, S2, and S3.

TABLE 1

| S3 | S2 | S1 | S0 | ECOs Logic Included |
|----|----|----|----|---------------------|
| 0  | 0  | 0  | 0  | None                |
| 0  | 0  | 0  | 1  | ECO1                |
| 0  | 0  | 1  | 0  | ECO2                |
| 0  | 0  | 1  | 1  | ECO2 + ECO1         |
| 0  | 1  | 0  | 0  | ECO3                |
| 0  | 1  | 0  | 1  | ECO3 + ECO1         |
| 0  | 1  | 1  | 0  | ECO3 + ECO2         |
| 0  | 1  | 1  | 1  | ECO3 + ECO2 + ECO1  |
| 1  | 0  | 0  | 0  | ECO4                |
| 1  | 0  | 0  | 1  | ECO4 + ECO1         |
| 1  | 0  | 1  | 0  | ECO4 + ECO2         |
| 1  | 0  | 1  | 1  | ECO4 + ECO2 + ECO1  |
| 1  | 1  | 0  | 0  | ECO4 + ECO3         |
| 1  | 1  | 0  | 1  | ECO4 + ECO3 + ECO1  |
| 1  | 1  | 1  | 0  | ECO4 + ECO3 + ECO2  |
| 1  | 1  | 1  | 1  | ECO4 + ECO3 + ECO2 + ECO1 |

For example when all of the four programmable signals S0, S1, S2, and S3 are "0," as shown in the first row of Table 1, the multiple alternate logic designs are not enabled and the digital logic device 300G operates in accordance with the primary logic design path. However, when it is determined that the digital logic device 300G is defective after the original tape out and silicon manufacturing and the defect is associated with each of the first circuit block 324a, the second circuit block 324b, the third circuit block 324c, and the fourth circuit block 324d, the primary logic design paths are bypassed in those circuit blocks. In this case, all of the four programmable signals S0, S1, S2, and S3 are "1," as shown in the last row of Table 1, to enable all of the multiple alternate logic designs while bypassing the primary logic design paths.

Figure 3H:
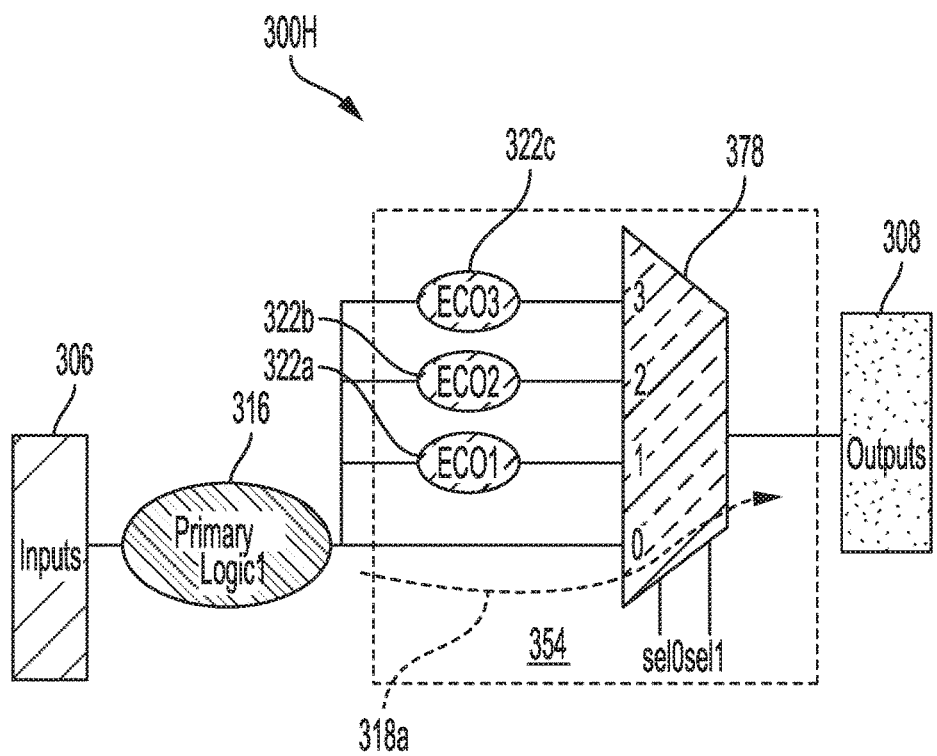

FIG. 3H illustrates a digital logic device 300H that includes multiple engineering change order logic or alternate logic designs in a parallel configuration in the logic path of the digital logic device 300H. For example, instead of having the first alternate logic design 322a (or ECO1), the second alternate logic design 322b (or ECO2), and the third alternate logic design 322c (or ECO3) in a series configuration as in FIG. 3G, the multiple alternate logic designs are in parallel. The alternate logic designs are also in parallel to the primary logic design path 318a, such that the primary logic design path 318a can be bypassed through one of the alternate logic design paths.

Alternatively, the first alternate logic design 322a is in parallel with the first primary logic 316 where the first alternate logic design 322a and the first primary logic 316 are selectable or de-selectable (e.g., via a multiplexer).

The primary logic design path 318a is within a circuit block 354 that is pre-identified as potentially defective. To mitigate the potentially defective portion of the digital logic device 300H, the multiple alternate logic designs are included (e.g., pre-routed) in the circuit block 354 prior to the original tape out. The multiple alternate logic designs are enabled using a multiplexer 378 when it is determined that at least a portion of the primary logic design path 318a is defective. The multiplexer 378 may be a higher multiplexer version (e.g., a 4:2 design selection multiplexer) that includes multiple selections (e.g., programmable signals sel0 and sel1) for selecting the multiple alternate logic designs. Table 2 illustrates multiple ways of realizing an engineering change order with the programmable signals sel0 and sel1 on the single multiplexer 378.

TABLE 2

| SEL1 | SEL0 | ECO Logic |
|------|------|-----------|
| 0    | 0    | None      |
| 0    | 1    | ECO1      |
| 1    | 0    | ECO2      |
| 1    | 1    | ECO3      |

For example when the two programmable signals sel0 and sel1 are "0," as shown in the first row of Table 1, the alternate logic designs are not enabled and the digital logic device 300H operates in accordance with the primary logic design path 318a. However, when it is determined that the digital logic device 300H is defective after the original tape out and silicon manufacturing and the defect is associated with the circuit block 354, the primary logic design path 318a is bypassed and one of the paths associated with the first alternate logic design 322a, the second alternate logic design 322b, or the third alternate logic design 322c is selected by the multiplexer 378. For example, when the two programmable signals sel0 and sel1 are "1," as shown in the last row of Table 2, the third alternate logic design 322c is enabled.

Figure 3I:
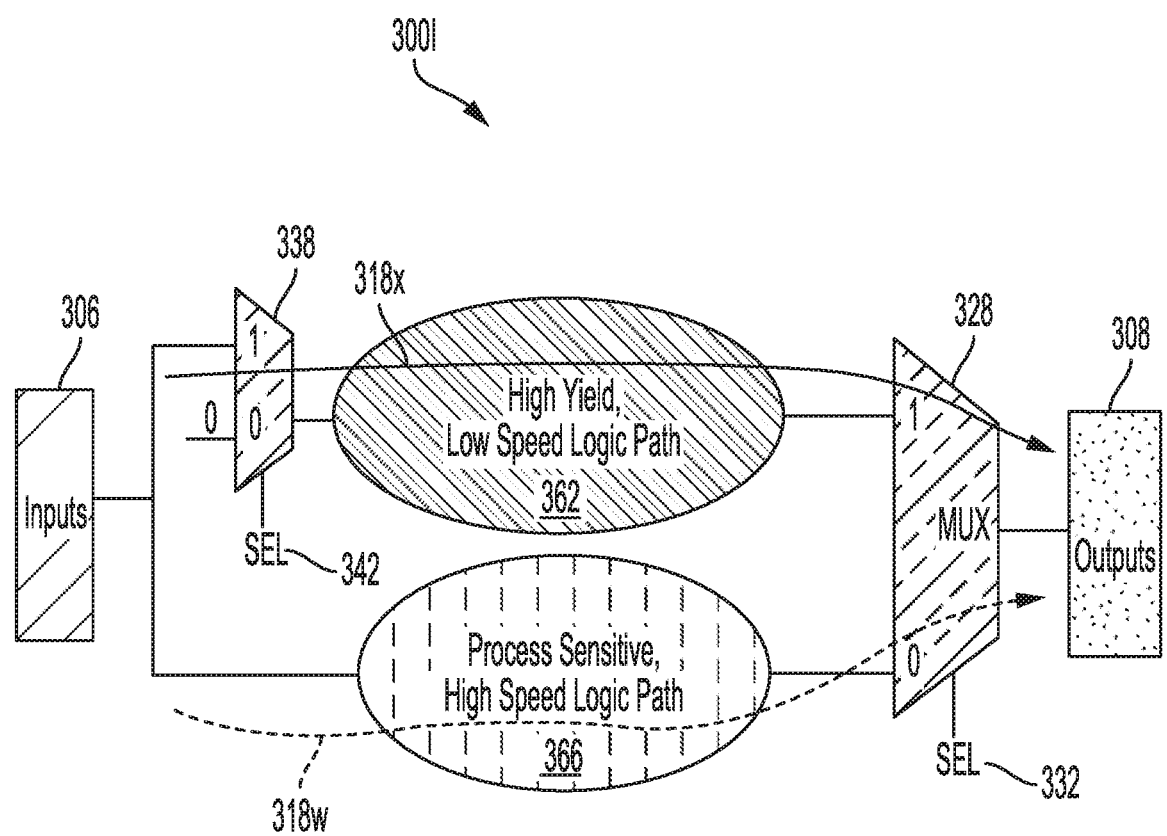

FIG. 3I illustrates a digital logic device 300I including an alternate logic design 362 that improves yield of the digital logic device 300I, according to aspects of the present disclosure. The digital logic device 300I may be deemed to be defective because a yield of its primary logic design path 318w including a primary logic 366 may be undesirable. The primary logic design path 318w may be a high risk path (e.g., a high speed logic path that has greater yield issues) while an alternate logic design path 318x is a low risk path (e.g., safer path that is slower with fewer yield issues). For example, the primary logic 366 may attain the specified frequency only when it is operating at a very high speed, thereby reducing the yield of the digital logic device 300I. In this case, the primary logic design path 318w is bypassed and the alternate logic design path 318x that includes the alternate logic design 362 is enabled to improve the yield of the digital logic device 300I. The alternate logic design path 318x may be a high yield, low speed logic path.

Figure 4:
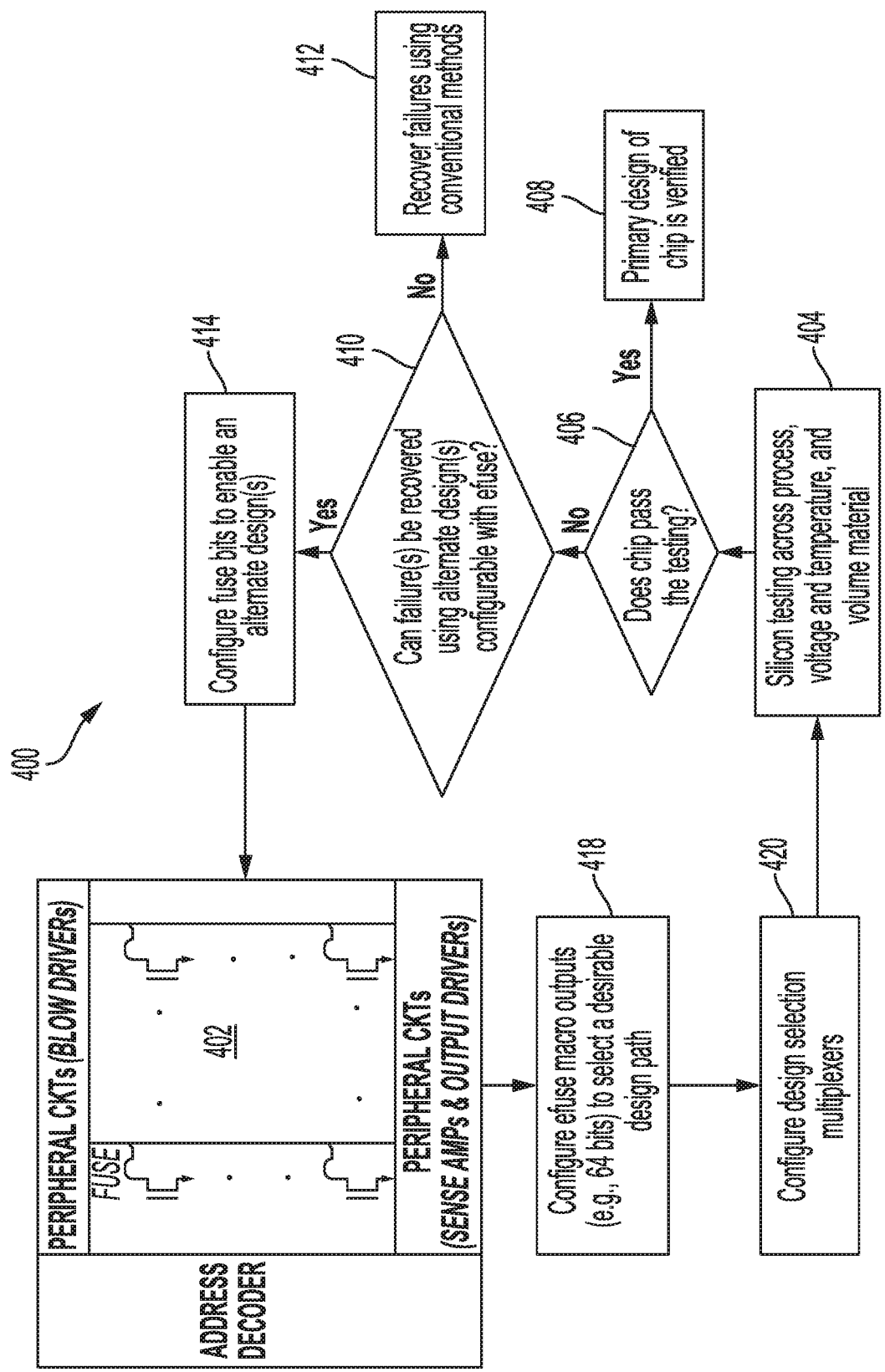
FIG. 4 illustrates an implementation of a design scheme to use fuse programming, according to aspects of the present disclosure.

FIG. 4 illustrates an implementation of a design scheme 400 to enable fuse programming, according to aspects of the present disclosure. After manufacturing a chip (e.g., after original tape out and silicon manufacturing), post-silicon testing and validation are performed, at block 404, to show that all of the features (e.g., functions) of the chip are working properly. The silicon testing may include process testing, voltage and temperature silicon testing, and testing across volume material.

At block 406, it is determined whether the chip passed the testing. When the chip passes the testing, the scheme continues to block 408 where the primary design of the chip is verified. Otherwise, when the chip fails the testing, the scheme continues to block 410 where it is determined whether the failure or defect can be recovered using alternate designs configurable with an efuse.

When it is determined that the failure cannot be recovered using alternate designs configurable with an efuse, the scheme continues to block 412 where the failure is recovered using conventional methods, which adds delay to the recovery process. For example, the spare logic gates are physically reconnected (connected and disconnected using metal layers) in the physical design. Otherwise, when it is determined the failure can be recovered using alternate designs configurable with an efuse, the scheme continues to block 414 where fuse bits of a programmable fuse bitcell array 402 are configured to enable the alternate (optimal or improved) design configurable with the efuse. The alternate design may be selected based on test data.

The programmable signals for controlling a selection between a primary functional logic path and an alternate logic design path are provided by the multiple efuses. The multiple efuses are part of a programmable fuse bitcell array 402 such as the efuse one-time programmable (OTP) memory 200 of FIG. 2. An efuse in the programmable fuse bitcell array 402 may be blown to select a design configuration (e.g., the primary functional logic path or the alternate logic design path) of a digital logic device. An initial setting where the fuse is not blown may correspond to the primary functional logic path.

At block 418, to select an alternate logic design path, one or more programmable signals that are output from the programmable fuse bitcell array 402 are configured to select a desirable design path for the digital logic device. The programmable signals may be efuse macro outputs (e.g., 64-bit efuse macro outputs). At block 420, the one or more programmable signals configure the design selection multiplexer(s). The scheme then continues to block 404 and test and validation are re-performed.

Figure 5:
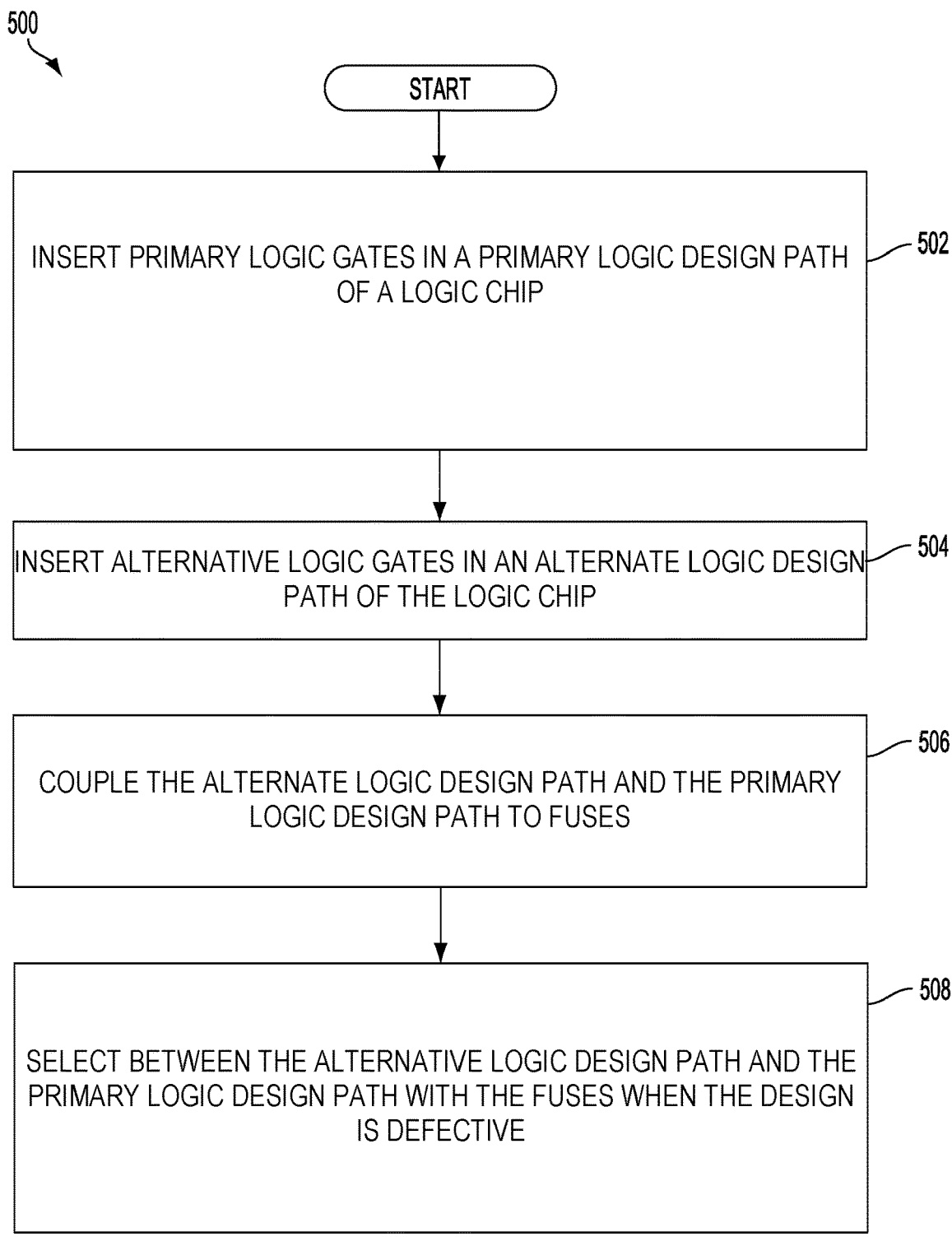
FIG. 5 depicts a simplified flowchart of a method for enabling fuse programming.

FIG. 5 depicts a simplified flowchart of a method 500 method for repairing a logic design. At block 502, primary logic gates are inserted in a primary logic design path of a logic chip. The primary logic design path may have a potentially defective design. At block 504, alternative logic gates are inserted in an alternate logic design path of the logic chip. At block 506, the alternate logic design path and the primary logic design path are coupled to multiple fuses. At block 508, the potentially defective design is repaired by selecting between the alternate logic design path and the primary logic design path with the multiple fuses when the design is defective.

Figure 6:
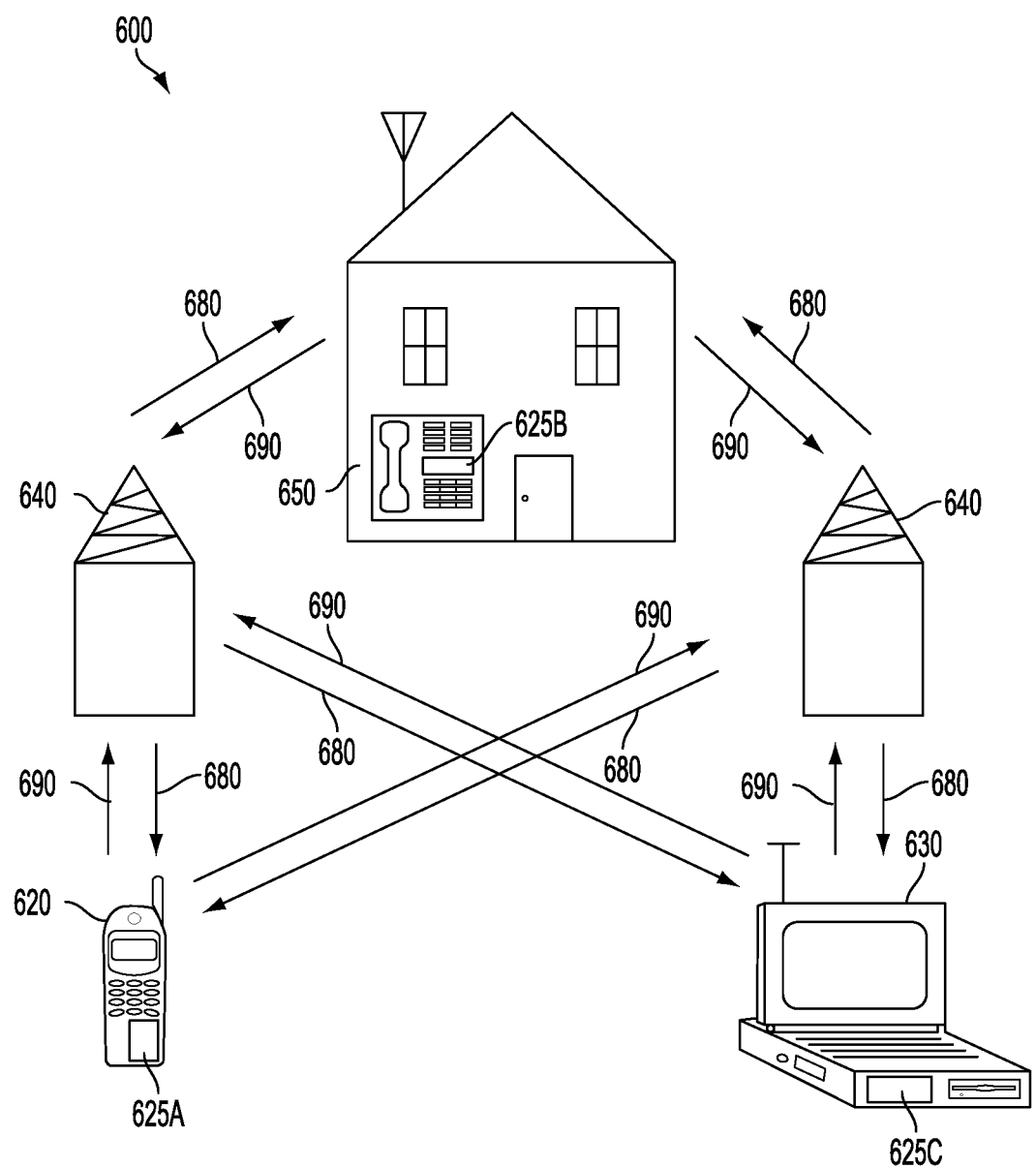
FIG. 6 is a block diagram showing an exemplary wireless communication system in which a configuration of the disclosure may be advantageously employed.

FIG. 6 is a block diagram showing an exemplary wireless communication system in which a configuration of the disclosure may be advantageously employed. For purposes of illustration, FIG. 6 shows three remote units 620, 630, and 650 and two base stations 640. It will be recognized that wireless communication systems may have many more remote units and base stations. Remote units 620, 630, and 650 include IC devices 625A, 625B, and 625C that include the disclosed digital logic device/design. It will be recognized that other devices may also include the disclosed digital logic device, such as the base stations, switching devices, and network equipment. FIG. 6 shows forward link signals 680 from the base station 640 to the remote units 620, 630, and 650 and reverse link signals 690 from the remote units 620, 630, and 650 to base station 640.

In FIG. 6, remote unit 620 is shown as a mobile telephone, remote unit 630 is shown as a portable computer, and remote unit 650 is shown as a fixed location remote unit in a wireless local loop system. For example, a remote unit may be a mobile phone, a hand-held personal communication systems (PCS) unit, a portable data unit such as a personal digital assistant (PDA), a GPS enabled device, a navigation device, a set top box, a music player, a video player, an entertainment unit, a fixed location data unit such as a meter reading equipment, or other communications device that stores or retrieves data or computer instructions, or combinations thereof. Although FIG. 6 illustrates remote units according to the aspects of the disclosure, the disclosure is not limited to these exemplary illustrated units. Aspects of the disclosure may be suitably employed in many devices, which include the digital logic device/logic design.

Figure 7:
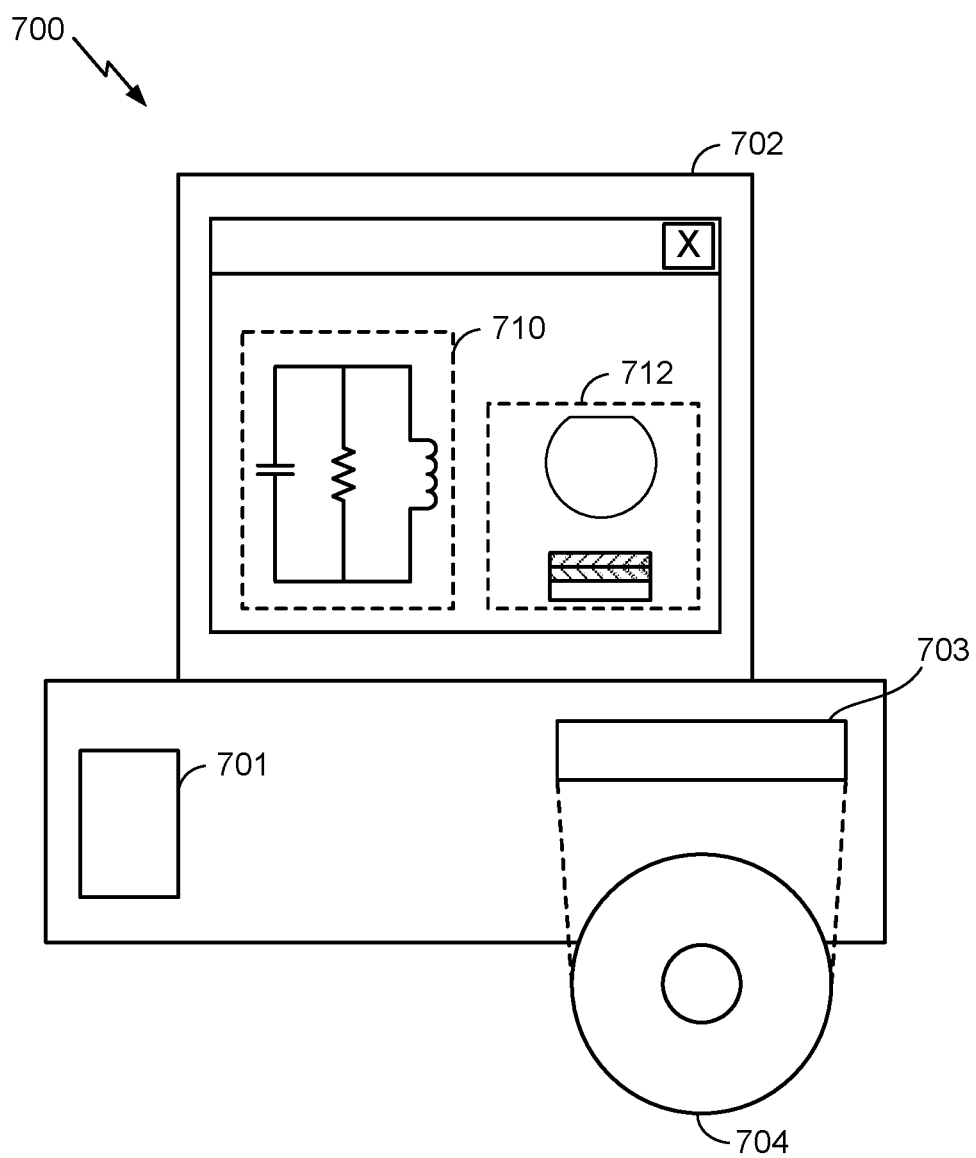
FIG. 7 is a block diagram illustrating a design workstation used for circuit, layout, and logic design of a digital logic device according to one configuration.

FIG. 7 is a block diagram illustrating a design workstation used for circuit, layout, and logic design of a digital logic device, such as the transistor array disclosed above. A design workstation 700 includes a hard disk 701 containing operating system software, support files, and design software such as Cadence or OrCAD. The design workstation 700 also includes a display 702 to facilitate design of a circuit 710 or a digital logic device 712. A storage medium 704 is provided for tangibly storing the design of the circuit 710 or the digital logic device 712. The design of the circuit 710 or the digital logic device 712 may be stored on the storage medium 704 in a file format such as GDSII or GERBER. The storage medium 704 may be a CD-ROM, DVD, hard disk, flash memory, or other appropriate device. Furthermore, the design workstation 700 includes a drive apparatus 703 for accepting input from or writing output to the storage medium 704.

Data recorded on the storage medium 704 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 704 facilitates the design of the circuit 710 or the digital logic device 712 by decreasing the number of processes for designing semiconductor wafers.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a digital logic device having signals indicative of instructions and data. The instructions and data are configured to cause one or more processors to implement the functions outlined in the claims.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A method for repairing a logic design, the method comprising:
   inserting primary logic gates in a primary logic design path of a logic chip;
   inserting alternative logic gates in an alternate logic design path of the logic chip;
   coupling the alternate logic design path and the primary logic design path to a plurality of fuses; and
   selecting a combination of the alternate logic design path and the primary logic design path, instead of the primary logic design path alone, with the plurality of fuses when the logic design is defective.

2. The method of claim 1, further comprising:
   coupling the alternate logic design path and the primary logic design path to the plurality of fuses via a multiplexer; and
   controlling the multiplexer with a programmable signal from at least one of the plurality of fuses to select the combination of the alternate logic design path and the primary logic design path.

3. The method of claim 1, in which the plurality of fuses are included in one-time programmable (OTP) blocks of an on-chip fuse-based programmable read-only memory.

4. The method of claim 1, further comprising pre-routing the alternate logic design path prior to an original tape out of the logic chip.

5. The method of claim 1, in which the alternate logic design path has a different functionality, performance, power, yield, reliability, or a combination thereof than the primary logic design path.

6. The method of claim 1, in which the plurality of fuses comprise efuses or antifuses.

7. The method of claim 1, in which the alternative logic gates comprise a NAND (not AND) gate, a NOR (not OR) gate, an inverter, an exclusive or (XOR) gate, an exclusive XNOR gate, flip flops, and/or buffers.

8. An apparatus for repairing a logic design, comprising:
   a memory comprising a programmable fuse bitcell array;
   at least one processor coupled to the memory and configured to read the memory; and
   a logic chip comprising:
      a primary logic design path, the primary logic design path comprising primary logic gates, and
      an alternate logic design path, the alternate logic design path comprising alternative logic gates, the alternate logic design path and the primary logic design path coupled to a multiplexer, the memory coupled to the multiplexer and configured to route a programmable signal to the multiplexer to select a combination of the alternate logic design path and the primary logic design path, instead of the primary logic design path alone, based at least in part on a value read from the programmable fuse bitcell array.

9. The apparatus of claim 8, in which the programmable fuse bitcell array comprises a plurality of fuses included in one-time programmable (OTP) blocks of the memory.

10. The apparatus of claim 9, in which the plurality of fuses comprise efuses or antifuses.

11. The apparatus of claim 8, in which the at least one processor is further configured to cause the alternate logic design path to be pre-routed prior to an original tape out of the logic chip.

12. The apparatus of claim 8, in which the alternate logic design path has a different functionality, performance, power, yield, reliability, or a combination thereof than the primary logic design path.

13. The apparatus of claim 8, in which the alternative logic gates comprise a NAND (not AND) gate, a NOR (not OR) gate, an inverter, an exclusive or (XOR) gate, an exclusive XNOR gate, flip flops, and/or buffers.

14. A non-transitory computer-readable medium having program code recorded thereon, the program code comprising:
   instructions to select a combination of an alternate logic design path comprising alternative logic gates and a primary logic design path comprising primary logic gates, instead of the primary logic design path alone, with a plurality of fuses when a logic design is defective, the alternative logic design path and the primary logic design path coupled to the plurality of fuses.

15. The non-transitory computer-readable medium of claim 14, further comprising program code
   to control a multiplexer with a programmable signal from at least one of the plurality of fuses to select between the combination of the alternate logic design path and the primary logic design path.

16. The non-transitory computer-readable medium of claim 14, in which the plurality of fuses are included in one-time programmable (OTP) blocks of an on-chip fuse-based programmable read-only memory.

17. The non-transitory computer-readable medium of claim 14, in which the alternate logic design path is pre-routed prior to an original tape out of a logic chip.

18. The non-transitory computer-readable medium of claim 14, in which the alternate logic design path has a different functionality, performance, power, yield, reliability, or a combination thereof than the primary logic design path.

19. The non-transitory computer-readable medium of claim 14, in which the plurality of fuses comprise efuses or antifuses.

20. The non-transitory computer-readable medium of claim 14, in which the alternative logic gates comprise a NAND (not AND) gate, a NOR (not OR) gate, an inverter, an exclusive or (XOR) gate, an exclusive XNOR gate, flip flops, and/or buffers.

* * * * *